INVENTOR:
BENELLI DONDI DORE

By: *Silverman & Cass*
ATTORNEYS

United States Patent Office 3,386,666
Patented June 4, 1968

3,386,666
ELECTRICAL COFFEE GRINDER WITH METERED DISPENSING DEVICE
Dondi Benelli Dore, Bologna, Italy, assignor to Carlo Ernesto Valente, Milano, Italy
Filed June 20, 1966, Ser. No. 558,966
Claims priority, application Italy, June 24, 1965, 14,562/65
6 Claims. (Cl. 241—33)

This invention relates to improvements in an electric coffee grinder and more particularly relates to a grinder of the character described having novel means for dispensing metered quantities of ground material in association with novel circuitry for automatic operation of the grinder.

An important object of the invention is to provide a coffee grinder machine of the character described which includes a dispensing device interposed between a hopper fed electric grinder and a discharge opening in the machine, said dispensing device being movable between a first position for receiving ground material from the grinder and a second position for discharging a metered quantity of ground material to said discharge opening, said movement of the dispensing means being operative so as to enable consecutive dispensing of such metered quantities of ground material automatically.

Another object of the invention is to provide a grinder of the character described in which said dispensing means comprises a fulcrum or balance arm pivoted for movement between said two positions, said fulcrum or balance arm including a dispensing formation on one end thereof and a counterweight formation on the other end thereof, said machine having electrical means interceptive by movement of said balance arm sequentially for controlling operation of said grinder machine automatically.

Other objects of the invention reside in a grinder machine of the character described which is relatively simple and economically constructive for achieving the functions desired therefrom and which is sturdy and easy to operate and service.

The foregoing and other objects of the invention will become apparent from the ensuing disclosure in which a preferred embodiment has been described in detail in the specification in conjunction with the accompanying drawing:

Figure 1:
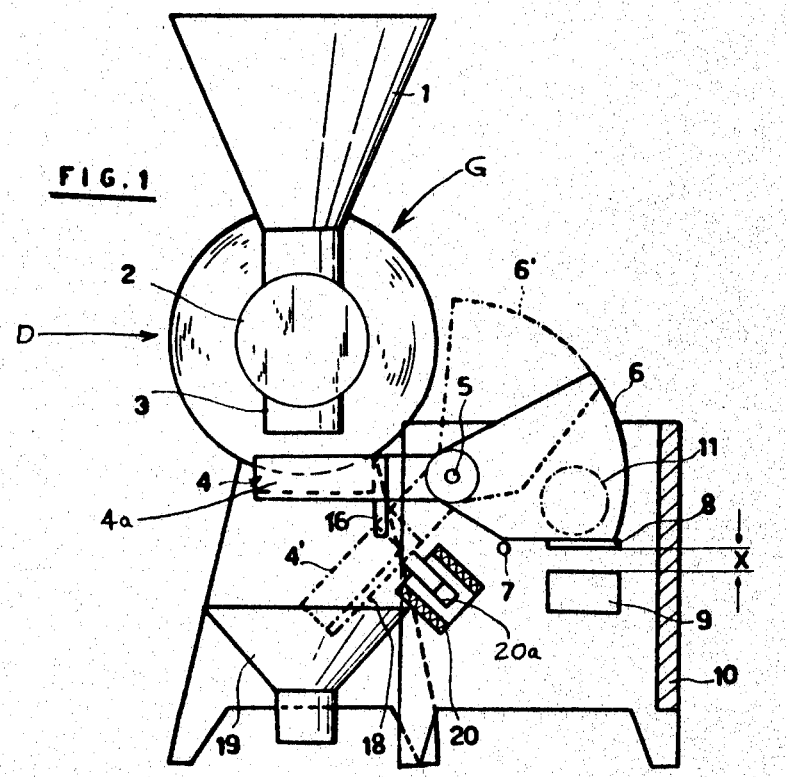
FIG. 1 is a side elevational view of the grinder machine embodying the invention with portions thereof in section to show important structural details.
Figure 3:
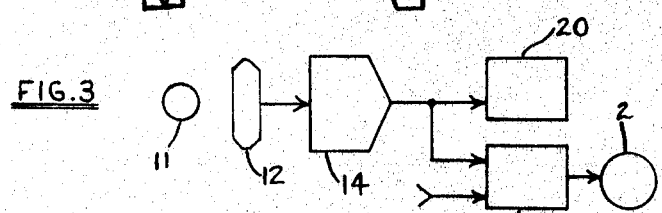
FIG. 3 is a generally diagrammatical view showing the flow pattern of signals in the electrical circuit of said grinder cooperating with the components thereof.

Referring now to the drawing, the reference character G designates generally the grinder machine embodying the invention. Said machine 10 is especially suitable for grinding coffee beans and dispensing the granular coffee in metered or predetermined amounts for which the machine is capable of adjustment selectively by the operator. However, the grinder machine G is capable of handling other materials and hence is not limited to the grinding of coffee.

The machine G has a conventional hopper 1 into which the coffee beans or other material to be ground is introduced. The hopper 1 is supported in communication with an electrically operated grinding apparatus D which includes the electrical motor and a grinder mechanism designated generally 2. Said electrically operated grinding mechanism 2 has a discharge duct 3, the discharge opening of which is aligned with the dispensing mechanism designated generally by the reference character 4.

Figure 2:
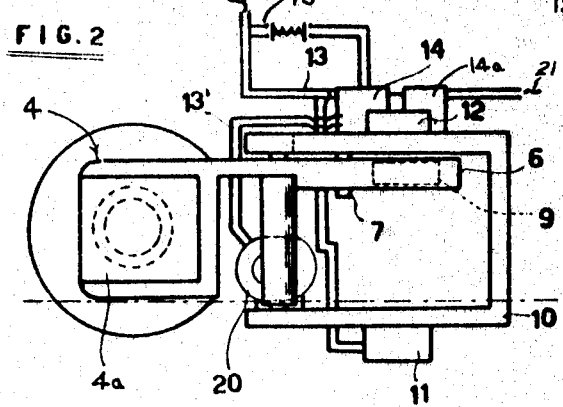
FIG. 2 is a generally top plan view of said grinder with diagrammatical details to illustrate portions of the electrical circuitry and electrical components of said machine.

The dispensing mechanism 4 comprises generally a balance or fulcrum arm pivoted intermediate the ends thereof upon the shaft or pin 5 which represents a horizontally oriented axis of pivot for said balance arm. One end of said dispensing mechanism 4 comprises a pan or shovel portion 4a opening upwardly toward the discharge duct 3. The shovel portion 4a is adapted to receive ground coffee or other material thereon. The opposite end of said device is formed as a counterweight designated 6 which is selected and arranged normally to maintain the mechanism 4 in the position thereof shown in solid outline in FIG. 1. In this position, the pan or shovel portion 4a is generally horizontally oriented immediately below the discharge duct 3. A stop or rest member 7 is provided for engaging the counterweight portion 6 to establish this position of the pan portion 4a. As seen in FIG. 2, the stop or rest member 7 is provided on a section of the housing 10 of the machine.

Likewise mounted on the housing 10 is a permanent magnet 9 which is intended to be adjustable in its vertical position. Secured to the underside of the counterweight 6 is a second magnet 8 which is spaced from the magnet 9 by the distance designated X as in the solid outline position of the mechanism 4 shown in FIG. 1. It will be appreciated that the magnetic attraction between the two magnets 8 and 9 will maintain the mechanism 4 in said solid outline position thereof until sufficient force is exerted on the shovel portion 4a to overcome the force of attraction between the magnets 8 and 9. Ground coffee or other material from the discharge duct 3 will accumulate on the pan or shovel portion 4a until the weight thereof is sufficient to exert a force overcoming the magnetic attraction between the magnets 8 and 9 thereby causing the fulcrum or balance arm to pivot to the broken outline position 4' thereof shown in FIG. 1. At this time the ground material on the pan portion 4a is discharged into the second hopper 19 in a predetermined metered amount for subsequent feeding to a coffee machine or other device in which said metered quantity of ground material will be used subsequently.

On one wall of the housing 10 is supported a light source 11 which may be provided by a conventional electric lamp positioned to transmit light to a photocell 12 located on an oppositely facing wall of the housing 10. In the solid outline position of the dispensing mechanism 4, the counterweight portion 6 is located between the light source 11 and the photoelectric cell 12 so as to prevent activation of said cell. The cell 12 is connected through a timed microswitch 14 to the switch 15 which is connected to operate the motor 2. The microswitch 14 also is connected to control operation of a solenoid 20 secured to the housing 10 as shown in FIG. 1.

Solenoid 20 is provided with a socket or opening 20a oriented and arranged to receive a pin 16 depending from the pan or shovel portion 4a when the dispensnig device 4 is pivoted to the broken outline position thereof.

With the solenoid 20 energized, the metallic pin 16 is pulled into the socket 20a to seat entirely therein thus assuring that the pan portion 4a will assume the position thereof shown by the broken outline 4'. In addition, a stop 18 is provided for that purpose.

For automatic recycling of the machine G, said machine may be turned on by means of a manual switch indicated generally in FIG. 2 at 14a.

The circuit is supplied from a power source indicated by the wavy lines 21. The mechanism 4 is in its solid outline position of FIG. 1 wherein the counterweight 6 prevents light rays from the lamp 11 impinging on the cell 12. The grinder is operating to discharge ground coffee for instance on the pan portion 4a. The ground coffee accumulates on the pan 4a until the weight thereof is such as to overcome the weight of the counterweight portion 6 and thereby exert a force downwardly on pan portion 4a which is greater than the magnetic force of attraction between the magnets 8 and 9. The balance arm will pivot counter-clockwise causing the counterweight portion 6 to eventually assume the position of the broken outline 6'. In this position, the counterweight portion has been withdrawn from between the photoelectric cell 12 and the light source 11 so that light can impinge on the cell 12.

When light impinges on the cell 12, the timed microswitch 14 is caused to close the circuit to the motor 2 by opening the switch 15. After a predetermined lapse of time sufficient for the ground coffee to be completely discharged from the pan portion 4a to the second hopper 19, the timed microswitch changes state to de-energize the solenoid 20 and release the metal pin 16 which has been attracted into the socket 20a. The counterweight will then cause the dispensing mechanism to pivot in a clockwise direction so that the counterweight 6 will return to a normal position on the stop or rest 7 and be held in that position by the magnets 8 and 9 as previously explained. This will result in the counterweight 6 being interposed between the photoelectric cell 12 and the light source 11 so as to close the microswitch 15 and start the motor 2 again. At the same time the solenoid 20 is energized and the machine is ready for another complete cycle.

The interposed switch 14a can be a manually operated switch for selectively turning the motor off when it is not desired to operate the grinding machine.

By adjusting the position of the magnet 9 relative to the position of the magnet 8, the operator is enabled to control the amount of ground coffee permitted to accumulate on the pan 4a before the counter-clockwise pivoting of the fulcrum arm to discharge the ground coffee into the hopper 19. Also, it should be recognized that there will be some discharge of ground coffee from the discharge duct 3 before the motor 2 is stopped. But these quantities are relatively small and can be calculated to establish the desired metered amount of coffee dispensed.

For purposes of distinctly pointing out and claiming the invention, it may be considered that the normal position of the empty pan or shovel portion 4a is generally horizontal wherein the counterweight portion on the opposite side of the fulcrum or pivot will be interposed between the light source 11 and photoelectric cell 12.

It is believed that the invention has been sufficiently described to enable the skilled artisan to practice the same. It is believed that minor variations in the construction, arrangement and proportion of the several parts of the invention may have occurred to the skilled artisan without departing from the scope of the invention as distinctly pointed out in the claims hereto appended.

What it is desired to secure by Letters Patent of the United States is:

1. A machine for grinding coffee beans or the like and thereafter dispensing the ground coffee or like material including:
   a housing;
   an electric grinder associated with said housing, said grinder having an outlet for discharging the ground material;
   a first hopper mounted for feeding such coffee beans into said grinder;
   a second hopper mounted to receive said material from said discharge outlet;
   dispensing means affixed to said housing, said dispensing means being interposed between said grinder and said second hopper and being movable between a first position for receiving ground material from the grinder and a second position for discharging a metered quantity of ground material to said second hopper, said movement of the dispensing means being operative so as to enable consecutive dispensing of such metered quantities of ground material automatically; and electrical circuit means connected between said dispensing means and grinder controlled by said movement of the dispensing means.

2. A grinding machine as defined in claim 1 wherein said dispensing means includes:
   a balance arm pivoted for movement between said first and second positions, said balance arm including a dispensing formation on one end thereof and a counterweight on the other end thereof; and
   said electrical circuit means including signal generating means mounted on said housing interceptive by movement of said balance arm sequentially for controlling operation of said grinder machine automatically.

3. A grinding machine as defined in claim 2 wherein said signal generating means includes:
   a light source;
   a photocell positioned opposite said light source; and
   a microswitch connected between said photocell and said electric grinder so that when said balance arm is withdrawn from between said light source and photocell, light will impinge on said photocell causing said microswitch to close the circuit to the electric grinder.

4. A grinding machine as defined in claim 2 wherein said counterweight includes:
   a first permanent magnet mounted thereon; and
   a second magnet is mounted on said housing spaced a distance from said first magnet so that the magnetic attraction between said magnets will maintain said dispensing means in said first position until sufficient force is exerted upon said dispensing formation to overcome the force of attraction between said magnets.

5. The grinding machine as defined in claim 4 wherein said distance between said first and second magnets is adjustable.

6. A grinding machine as defined in claim 2 wherein said balance arm includes:
   a pin depending from said balance arm at said dispensing formation end; and
   a solenoid mounted on said housing such that when said solenoid is energized, said pin is pulled into said solenoid to effectuate movement of said dispensing means from said first to said second position.

References Cited

UNITED STATES PATENTS

| | | | |
|---|---|---|---|
| 2,187,102 | 1/1940 | Schuhmann | 241—33 X |
| 2,327,282 | 4/1943 | McComb | 241—33 X |
| 2,767,926 | 10/1956 | Trief et al. | 241—34 X |
| 2,864,537 | 12/1958 | Throop et al. | 241—34 X |
| 3,334,675 | 8/1967 | Satake | 241—33 X |

HARRISON L. HINSON, *Primary Examiner.*